April 11, 1967   J. FASSIO   3,312,994
BRUSH DEVICE FOR CLEANING, SCOURING AND POLISHING
Filed March 1, 1965
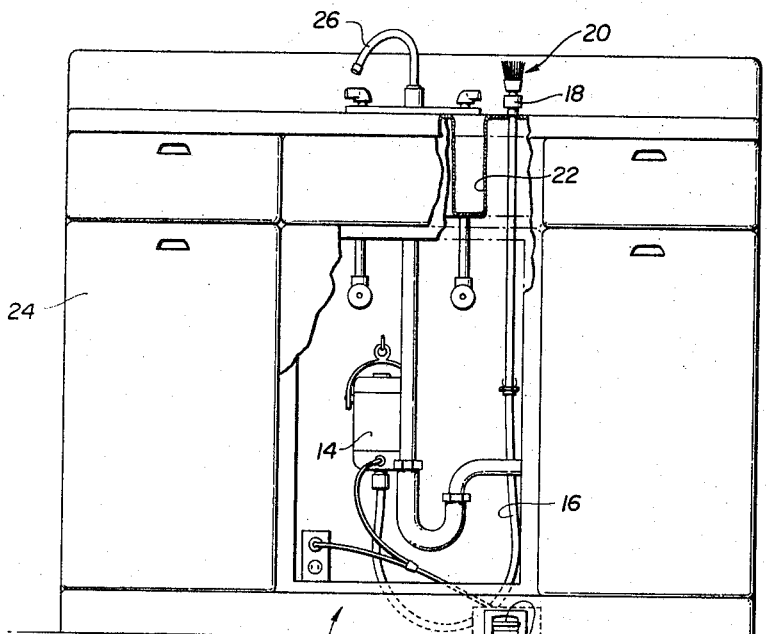
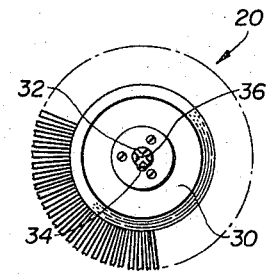
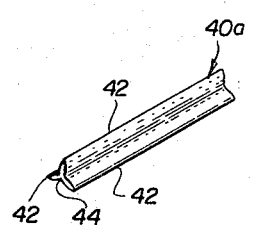
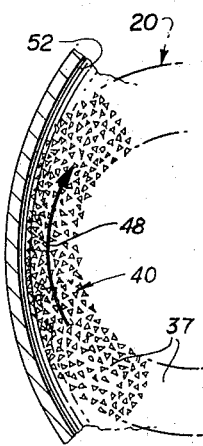
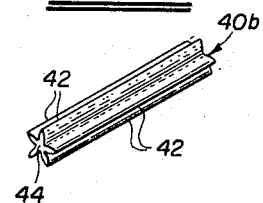
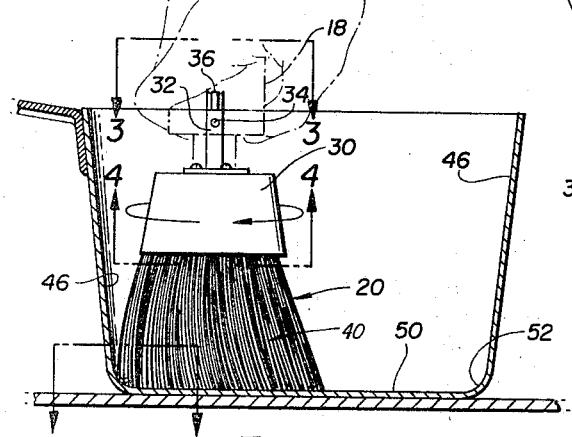
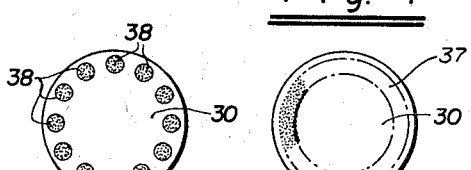
INVENTOR.
Julius Fassio
BY
Attorneys United States Patent Office 3,312,994
Patented Apr. 11, 1967

3,312,994
BRUSH DEVICE FOR CLEANING, SCOURING
AND POLISHING
Julius Fassio, 1135 Francisco St.,
San Francisco, Calif. 94109
Filed Mar. 1, 1965, Ser. No. 436,006
5 Claims. (Cl. 15—180)

This invention relates to a device for cleaning, scouring and polishing.

In my prior Patent 3,014,229, I have disclosed a rotary device for facilitating the cleaning of pots and pans, as well as carrying out various other household purposes. As is well known, one of the most laborious tasks in the home is the cleaning of pots and pans, which cannot be suitably cleaned in mechanical dishwashers.

In general, it is an object of the invention to improve upon the construction of my prior device, particularly with respect to provision of a novel rotary brush means for scouring, cleaning and polishing pots and pans.

It is another object of the invention to provide an improved brush means of such character having a novel bristle construction.

It is another object of the invention to provide a brush means of the above character which is especially effective in removing food encrustations, such as dried or baked layers of food, from the sides and bottoms of cooking utensils.

It is another object of the invention to provide a brush means of such character in the form of a readily removable attachment.

Additional objects and features of the invention will appear from the following description in which the preferred embodiment has been set forth in detail in conjunction with the accompanying drawing.

Referring to the drawing:

FIGURE 1 is a front elevational view of a conventional household sink upon which a device incorporating my new brush construction is mounted;

FIGURE 2 is an enlarged view in side elevation of a brush construction incorporating my invention, showing its use in a typical cleaning and scouring operation;

FIGURE 3 is a view in top plan of my new brush construction, taken along the line 3—3 of FIGURE 2;

FIGURE 4 is a view in horizontal section along the line 4—4 of FIGURE 2;

FIGURE 5 is a slightly enlarged detail view along the line 5—5 of FIGURE 2, illustrating a particular use of a brush construction incorporating my invention;

FIGURE 6 is a greatly enlarged detail view of a portion of a bristle useful in a brush incorporating my invention;

FIGURE 7 is a view like FIGURE 6 illustrating another embodiment of my invention; and FIGURE 8 is a view like FIGURE 4 illustrating a further embodiment of my invention.

Generally stated, the present invention is predicated on my discovery that a rotary brush provided with bristles having a nonuniform cross section, and preferably characterized by an odd number of outer surface engaging edges, possesses an unexpected ability to clean, scour and polish dirty pots and pans. I have particularly found that a bristle construction formed with three or five outer surface engaging edges will produce an unexpected, highly efficient scouring and polishing action when employed in conjunction with a rotary brush. I have further found that a preferred embodiment of my invention makes use of bristles in the form of extruded plastic filaments, for example, extruded nylon or like polymer resin filaments characterized by toughness, durability and wear resistance during use.

A brush device incorporating my invention is particularly adapted for use with a mechanism of the type shown in my earlier Patent 3,014,229, and generally represented at 12 in FIGURE 1. Such mechanism comprises an electric motor or other drive means 14, a flexible cable 16, a speed reducing unit 18, and brush means 20 incorporating the present invention. The entire mechanism is designed for use in a conventional kitchen installation in conjunction with a sink 22 suitably mounted in a cabinet 24 and provided with an outlet 26 for hot or cold water. The mechanism is preferably controlled by means of a foot pedal 28 whereby the motor 14 can be stopped and started, and driven at different speeds.

In use, the brush device 20 and the flexible drive cable 16 are pulled upwardly through an opening in the sink, and the brush positioned for use in a cleaning operation as generally illustrated in FIGURE 2.

The brush device 20, as illustrated in FIGURES 2 through 6, comprises a rotary base 30 of generally frusto-conical configuration, provided with a suitable connector 32 for establishing a drive connection with the flexible cable 16. In the illustrated apparatus, the connector 32 consists of an axial extension provided with a spring biased detent 34 which cooperates with the interlocking drive connection 36 to permit the brush means to be detachably secured in nonrotative fashion to the flexible drive cable 16. This construction permits the brush means 20 to be renewed or replaced as may be desirable or necessary.

Referring particularly to FIGURES 3 and 4, my rotary brush device is seen to comprise a series of bristles arranged uniformly about the periphery of the base 30, on a side opposite the connector 32. For example, I have found that a particularly satisfactory brush construction will employ a relatively tight ring of bristles, represented at 37 in FIGURES 4 and 5. Such brush will normally approximate two to three inches in diameter.

It is a feature of the present invention that the bristles 40 are formed with a nonuniform cross section, for example, by being extruded as filaments through a desired forming die. In preferred embodiments illustrated in FIGURES 6 and 7, the bristles have a nonuniform cross sectional configuration characterized by an odd number of outer surface engaging edges or fins 42. I have found that at least three but no more than five such edges produce an unexpected scrubbing or scouring effect when used in conjunction with my rotary brush device 20. More specifically, at rotary speeds of the order of 600 r.p.m. as described in my aforementioned Patent 3,014,229, bristles having the described nonuniform configuration achieve a highly efficient and entirely unexpected cleansing or abrasive action without any appreciable tendency towards scratching or scoring of the surface being cleaned. It is believed that this unique scrubbing or scouring effect is achieved by the odd number of longitudinal edges 42, which, when coupled with the rotary motion of the brush, insures that one of the edges 42 is always in abrasive contact with the side of a pan or other surface being cleaned. At the same time, the irregular end surface 44 of the bristles effects analogous scrubbing or scouring of the bottom of the pan.

The foregoing operation of my brush construction can best be described with particular reference to the preferred bristle configuration 40a illustrated in FIGURE 6. This embodiment presents three longitudinal edges 42 for engagement with the interior wall surface of a pan being cleaned (represented at 46 in FIGURE 2). As the brush 20 rotates, the longitudinal edges 42 are swept into engagement with the interior surface 46, in a rotary path generally represented by the arrow 48 in FIGURE 5. As the bristles are pressed against the side of the pan, the interaction of bristles of nonuniform cross section within the ring 37 tends to insure that a plurality of edges 42 are brought into continuing engagement with the side of the pan. In somewhat similar fashion, the edges presented by the irregular angles of the end surface 44 sweep across the bottom 50 of the pan, effecting a substantial increase in the end abrasion on the bottom of the pan. These enhanced abrasive effects are combined in the normally difficult area to clean in the corner of the pan, indicated at 52 in FIGURES 2 and 5. The net effect is a substantially improved cleaning and scouring action, achieved through use of the described nonuniform bristle configuration in a rotary brush.

FIGURE 7 illustrates a satisfactory variation in the nonuniform cross sectional configuration of the bristles 40. Thus, the bristle configuration 40b of FIGURE 7 presents five longitudinal edges 42. In general, I find that a deeply grooved configuration, as in FIGURES 6 and 7, is necessary to satisfactory operation of my rotary brush device. In contrast, conventional bristles of circular cross section fail to produce the desired abrasive effect against either the side or bottom of the pan. In like fashion, bristles of rectangular or oblong configuration are less satisfactory in use, due primarily to their tendency to present the flat sides to the side surface of the pan.

In general, the bristles employed in my brush construction are characterized by their toughness, durability and wear resistance. I have found that easily extruded plastic materials selected from the group of polymer resins (for example, polyamides such as nylon, polyethylene and polyfluoroethylene resins, acrylate or polyacrylate resins, styrene resins, or vinyl or polyvinyl resins) to be particularly satisfactory. In addition to facilitating extrusion of the desired bristle configuration, these materials possess the desired characteritsics of durability, wear resistance, and toughness. They are also low in cost and readily available, particularly preferred materials such as nylon, polytetrafluoroethylene, and certain of the acrylates. However, it should be understood that the present invention is in no way limited to the material employed in fabricating bristles, provided they possess the desired characteristics of toughnes, flexibility, durability, abrasion and chemical resistance. In general, extruded plastic filaments having three or five longitudinal edges (as illustrated in FIGURES 6 and 7), and having a length of from one to five inches and an outer diameter of from 0.015 to 0.15 inch, are to be preferred.

As a variation, the bristles 40 may be conveniently arranged in tufts 38 around the lower periphery of the base 30, as particularly shown in FIGURE 8. This construction generally insures a somewhat increased flexibility of the bristles and tufts during use. In normal cleaning operations, which require a somewhat more rigid brush, I have found it preferable to employ a ring of bristles, as illustrated at 37 in FIGURE 4.

From the foregoing, it will be apparent that I have provided a new and improved rotary brush device for scouring, scrubbing, cleaning and polishing. My brush is particularly effective when used in conventional manner with detergents, soaps, or mildly abrasive cleansing powders. My brush is particularly useful in the cleansing and scouring of food encrusted pots and pans, such as baking dishes, frying pans and the like. I have generally found my brush to be effective in the most difficult cleaning operations, such as the scouring and polishing of cooking utensils, caked with burned or charred foods, and to require a very short period of time and virtually no effort in carrying out such operations.

I claim:

1. In a rotary brush device: a rotary base, a connector mounted on said base, said connector being provided with means for detachably securing said brush device to a rotary drive mechanism, and bristles with relatively deep longitudinally extending grooves secure to said base on a side opposite said connector, said bristles having cross sectional configuration characterized by an odd number of relatively sharp outer surface engaging fins formed by said grooves, each of said outer surface engaging fins terminating in a single longitudinally extending sharp edge for scouring and polishing the wall surface of a pan being cleaned.

2. A brush device as in claim 1 wherein said bristles are provided with three surface engaging fins.

3. A brush device as in claim 1 wherein said bristles are provided with five surface engaging fins.

4. A brush device as in claim 3 wherein said bristles are arranged uniformly around the periphery of said opposite side of the base.

5. A brush device as in claim 1 wherein the ends of said bristles are of irregular cross section and substantially co-planar.

References Cited by the Examiner

UNITED STATES PATENTS

| | | | |
|---|---|---|---|
| 1,557,166 | 10/1925 | Horn | 15—180 X |
| 2,565,047 | 8/1951 | Rowland | 15—198 |
| 2,637,893 | 5/1953 | Shaw. | |
| 2,876,477 | 3/1959 | Stewart. | |
| 2,944,271 | 7/1960 | Foster et al. | 15—230 X |
| 3,024,883 | 3/1962 | Eriksson | 15—28 X |
| 3,026,552 | 3/1962 | Price | 15—230 X |
| 3,186,018 | 6/1965 | Shaw | 15—159 |

FOREIGN PATENTS

| | | |
|---|---|---|
| 627,848 | 5/1963 | Belgium. |
| 531,551 | 10/1956 | Canada. |
| 1,140,901 | 12/1962 | Germany. |

CHARLES A. WILLMUTH, *Primary Examiner.*

PETER FELDMAN, *Assistant Examiner.*